June 17, 1941.  G. R. CONSTANTINE  2,245,904
METHOD OF AND MACHINE FOR MAKING WEDGE HEELS
Filed March 12, 1940  6 Sheets-Sheet 1

Inventor.
GEORGE R. CONSTANTINE
by David Rines
Att'y.

June 17, 1941.    G. R. CONSTANTINE    2,245,904
METHOD OF AND MACHINE FOR MAKING WEDGE HEELS
Filed March 12, 1940    6 Sheets-Sheet 3

Inventor.
GEORGE R. CONSTANTINE
by David Rines
Atty.

June 17, 1941.   G. R. CONSTANTINE   2,245,904
METHOD OF AND MACHINE FOR MAKING WEDGE HEELS
Filed March 12, 1940   6 Sheets-Sheet 4

Inventor.
GEORGE R. CONSTANTINE
by David Rines
Atty.

June 17, 1941.   G. R. CONSTANTINE   2,245,904
METHOD OF AND MACHINE FOR MAKING WEDGE HEELS
Filed March 12, 1940   6 Sheets-Sheet 5

Inventor.
GEORGE R. CONSTANTINE
by David Rines
Att'y.

June 17, 1941.   G. R. CONSTANTINE   2,245,904
METHOD OF AND MACHINE FOR MAKING WEDGE HEELS
Filed March 12, 1940   6 Sheets-Sheet 6

Inventor.
GEORGE R. CONSTANTINE
by Davis Rines
atty.

Patented June 17, 1941

2,245,904

UNITED STATES PATENT OFFICE 2,245,904

METHOD OF AND MACHINE FOR MAKING WEDGE HEELS

George Roland Constantine, Malden, Mass., assignor to The Service Wood Heel Co., Lawrence, Mass., a corporation of Massachusetts Application March 12, 1940, Serial No. 323,565

24 Claims. (Cl. 12—46)

The present invention relates to methods of and machines for making heels, and more particularly wedge heels. The invention is particularly related to methods of and machines for operating on wood-heel blocks.

Present-day methods of and machines for operating on wood-heel blocks are not well adapted to the production of wedge heels. This is because the shape of wedge heels is so different from heels of other types that new problems are presented the solution of which requires processes different from those heretofore employed in the wood-heel industry. Because of this difference, manufacturers generally have found it necessary to shape the attaching portion of the heel block prior to turning the back and the sides thereof. As the heel block is of great thickness before turning, this involves the use of stronger cutters and consequently heavier machinery, as well as increased amounts of power. Since the attaching portion of the heel block is shaped prior to turning, furthermore, there is danger that the subsequent turning operation will result in decentering the heel. There are also other disadvantages.

An object of the invention, therefore, is to provide a novel method of making wedge heels, according to which the turning step precedes the shaping of the attaching portion.

A further object is to provide a novel machine for shaping the attaching portion of the heel blank.

Another object is to provide a novel method of and machine for inclining the arch of the said attaching portion.

Still another object is to provide a novel machine that shall be readily adaptable to the production of all sizes and shapes of wedge heels that are met with in practice.

Other and further objects will be described hereinafter and will be particularly pointed out in the appended claims.

The invention will now be described in connection with the accompanying drawings, in which.

Figure 8:
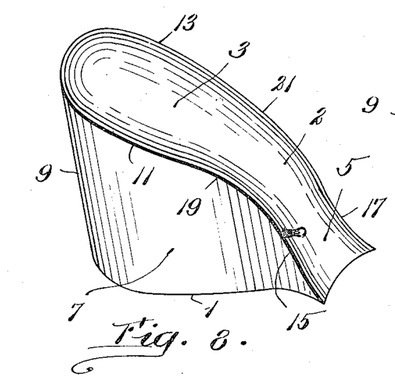
Figs. 8 and 9 are perspectives of two wedge heels that may be made in accordance with the present invention.
Figure 9:
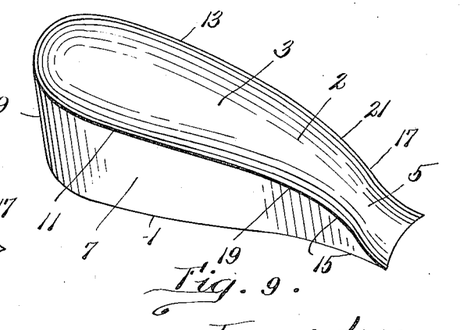

Two completed wedge heels are shown in Figs. 8 and 9, each provided with a tread face 1, a heel-attaching portion comprising a heel portion 3 and a shank portion 5, merging at an intermediate or arch portion 2, two side portions 7 and a back 9. The faces 7 are separated from the heel portion 3 by sharp lines 11 and 13, from the shank portion 5 by sharp lines 15 and 17, and from the intermediate portion 2 by sharp lines 19 and 21. The heel-and-shank portion of the heel is thus separated from the sides 7 of the heel by a continuous sharp contour 15, 19, 11, 13, 21, 17. The heel-and-shank portion 3, 5 of the heel is concave. Corresponding points of the lines 11 and 13 may be substantially at the same level, assuming the tread face 1 horizontal, and the same may be true of corresponding portions of the lines 15 and 17. Points of the line 21, at the intermediate or arch portion of the heel, in Fig. 8, however, are usually slightly higher than the corresponding points of the line 19, as will hereinafter be more fully explained, to provide an inclined arch portion for the heel-attaching portion of the heel. The points of the lines 11 and 13, as the points of the lines 15 and 17, need not be exactly at the same level; but they may be regarded so, for purposes of description, as distinguished from the lines 19 and 21, between which there is usually a larger incline. In all cases, however, the degree of incline is usually small.

Many different sizes and styles of wedge heels may be made in accordance with the present invention; the high wedge heel of Fig. 8, for example, is deeper than the low-wedge heel of Fig. 9 in that its sides 7 and back 9 are of greater dimension.

Figures 14, 15:
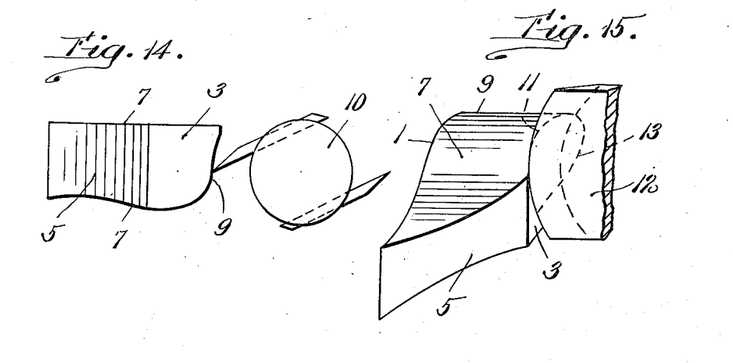
Fig. 14 is a diagrammatic plan illustrating the turning step.
Figs. 15, 16 and 17 are diagrammatic perspectives illustrating successive steps in the shaping of the heel-attaching portion of the wedge heel.
Figures 16, 18:
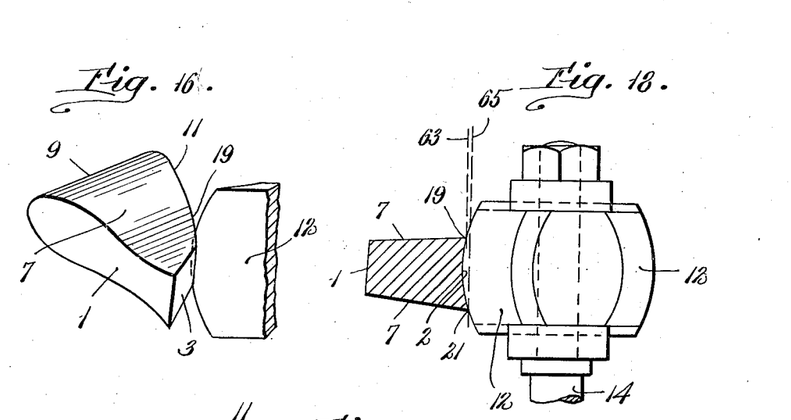
Fig. 18 is a section corresponding to the perspective of Fig. 16.
Figure 17:
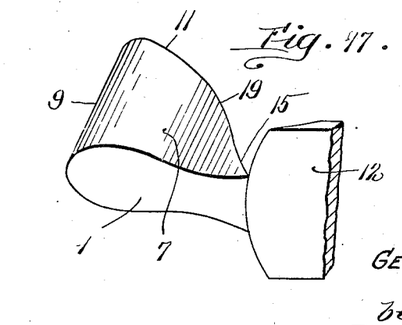

The heel is manufactured from a rough-sawed wood-heel block. The first step is to shape the back and the sides of the heel, which may be effected in any desired manner, as with the aid of any well known turning machine having a turning cutter 10. In Fig. 14, the turning cutter is shown as having already turned one side 7 of the heel down to the back 9. After the other side 7 and the remainder of the back 9 have also been turned, the block will still require shaping of the heel-attaching portion which, at this time, consists of a flat heel face 3 and a flat shank face 5, inclined to each other at an angle, as illustrated in Fig. 14. In Fig. 15, a cutter 12, mounted upon a spindle 14 that rotates rapidly about a vertical axis, is shown in the step of forming the heel portion 3. The spindle 14 may be rotated by a pulley 17 in the direction of the arrow of Fig. 7. To this end, the back of the heel-attaching portion of the heel block is first presented to the cutter 12, after which the heel block is swung past the cutter 12, in the manner more fully described hereinafter, so as to have the cutter 12 act continuously first along the intermediate or arch portion 2, as illustrated in Fig. 16, and finally the remainder of the shank portion, as shown in Fig. 17. As will also be hereinafter explained, the arch portion 2 of the heel-attaching portion of the heel is inclined simultaneously with this molding operation. The attaching portion of the heel becomes thus formed to the shape of the heel-attaching and shank portions of a shoe to which the heel is to be attached, with the shank portion extending to the tread face of the heel block. A preferred machine for effecting this operation will now be described.

After turning, the block is clamped in a wood-heel-block jack or holder 8, between lower and upper jaws 4 and 6 thereof that are shaped to conform approximately to the shape of the turned heel. As illustrated more particularly in Figs. 5 and 7, the lower face of the lower jaw 4 is shaped to conform to one side 7 of the turned heel block and the upper jaw 6 to the other side 7. The lower jaw 4, however, is provided with an upstanding face 21 that conforms, in part, to the shape of the back 9 of the turned heel. The lower portion of the lower jaw 4 rests against a horizontal plate 25 and the upstanding portion 21 against a vertical plate 23. Because of this shaping of the jaws 4 and 6, the turned heel is held firmly in place, with the heel-attaching portion 3, 2, 5 of the heel block exposed, in order that this heel-attaching portion may be presented to the cutter 12. It is desirable, under some circumstances, to make the jaws 4 and 6 of some soft metal, and to fasten to one or both jaws a sandpaper or other rough layer 33 (shown in Figs. 4 and 7) for holding the heel securely during the operation of the cutter. The upper jaw 6 may be manipulated in any desired way, as by means of a linkage mechanism comprising two links 27 and 127, by a handle 20 at the end of a lever 22 connected with the link 127. Any desired degree of pressure may be applied to the heel block through the jaw 6 by pressing downward on the handle 20. The handle 20 will force downward the lever 22 about a pivot 110. This will force upward the linkage mechanism 127, 27 about pivots 112 and 114. The left-hand portion of the link 127, as viewed in Fig. 4, being forced upward, the right-hand portion carrying the jaw 6 will be forced downward about a pivot 116. The pivot 116 is held stationary by reason of the fact that it is secured in side plates 118 that are held rigid to side plates 120. The side plates 120 in turn are rigidly secured by bolts 122 to a bracket 124 that is secured to the jack 8. A screw 126 that extends through openings in plates 128 and 130 is screwed into a plate 132 that is fixed to the plates 120 by pins 134. A spring 29 disposed about the screw 126 between the plates 130 and 132 holds the plates 128 and 130 and, therefore, the plates 118, rigidly, though yieldingly, to the plates 120, thus preventing movement of the pivot 116. Vertical adjustment of the pivot 116 in vertically elongated openings 135 in the plates 120 is provided for by turning adjustment of the screw 126 the non-circularly shaped head of which may then be locked in an opening 140 in the plate 128.

Figures 1, 2, 3:
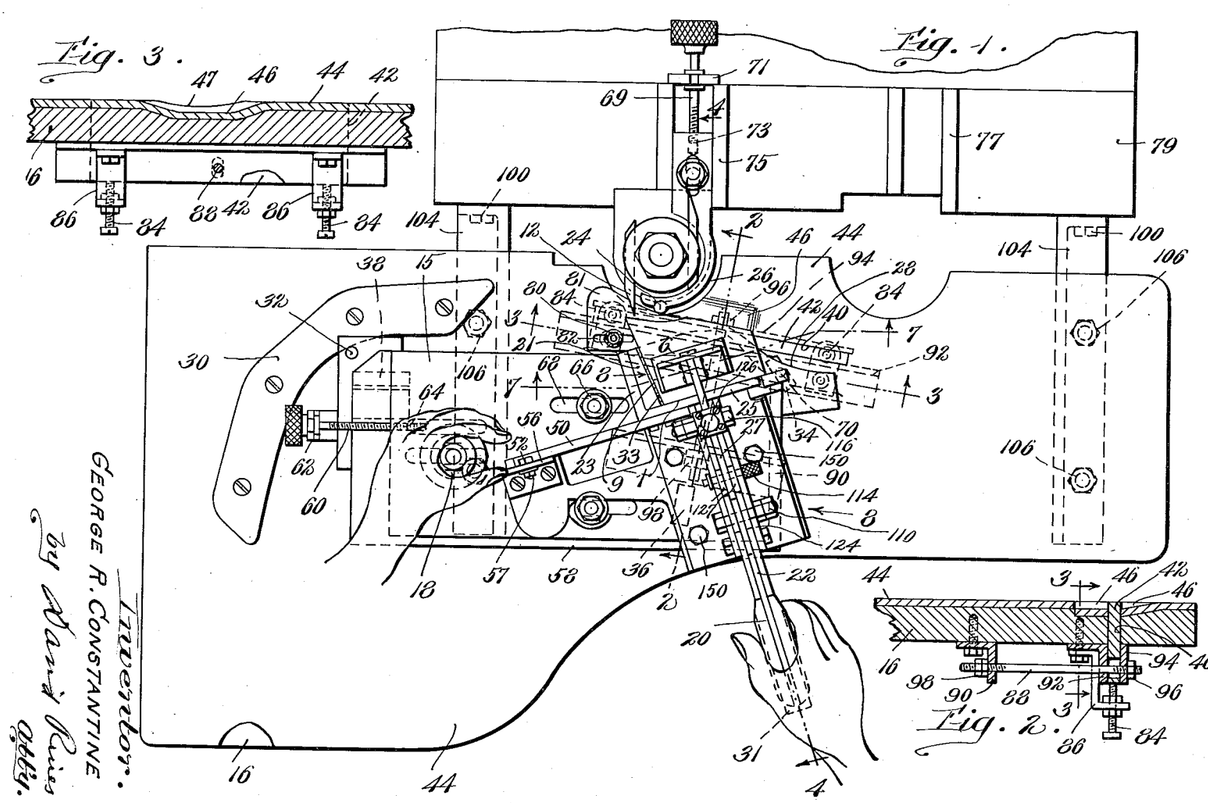
Fig. 1 is a plan of a machine embodying the invention in preferred form.
Figs. 2, 3 and 4 are vertical sections taken upon the lines 2—2, 3—3 and 4—4, respectively, of Fig. 1, but upon larger scales, the sections being taken looking in the direction of the arrows.

The jack 8 that carries the jaws 4 and 6 is mounted upon a heel-block support 15 that is freely movable over a table support 16 in order to present the clamped heel block to the cutter 12. The support 15 is moved over the table 16 manually, one hand of the operator, as illustrated in Fig. 1, grasping a knob 18 on the support 15, and the other hand grasping both the handle 20 for manipulating the movable jaw 6 and a handle 31 that is fixed to the jack, as illustrated more particularly in Fig. 4. Different portions 3, 2, 5 of the heel-attaching face of the heel block are thus manually presented to the cutter 12, as before described in connection with Figs. 15, 6 and 17.

Owing to the strong action of the cutter 12, the operator would find difficulty in properly holding the heel block against the cutter, but this difficulty is avoided by the use of suitable cooperating guides. A stationary guide 24, in the form of a knob projecting from a guard 26 on a stationary part of the machine, directly adjacent to, in front of, and below, the cutter 12, is slidably engaged by a guiding surface 28 on the support 15, and a stationary guiding surface 30, fixed to the support 15 at a point remote from the cutter 12, is slidably engaged by a projecting guide 32, in the form of an upstanding pin or projection on the support 15. The guiding surfaces 28 and 30 are shaped so to cooperate simultaneously with the guide projections 26 and 32 during the movement of the heel-block support 8 over the table support 16 as to cause the cutter 12 to produce the desired shape in the heel-attaching portion 3, 2, 5 of the heel.

As the table support 16 is planar and substantially horizontal, the heel-block support 8 is moved in substantially a horizontal plane parallel to the plane of the table 16 during the presentation of the heel block to the cutter. The jack support 8 could rest flat upon the table support 16, but it is preferable to have it contact the table support 16 through the medium of three small downwardly projecting feet 34, 36 and 38. These feet ride over the table 16 as the support 15 is manually manipulated to force the heel-attaching portion of the heel block into the cutter 12.

Figures 4, 5, 6:
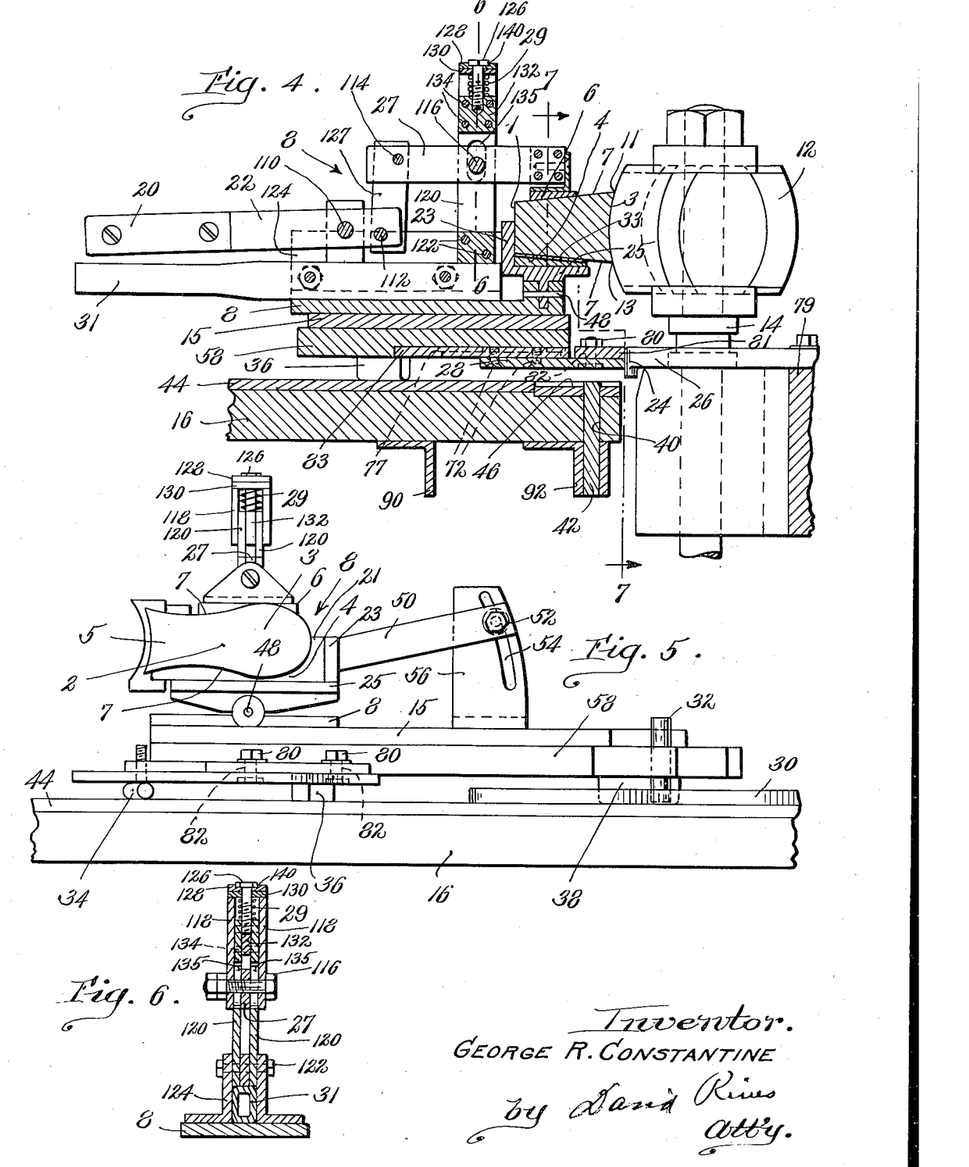
Fig. 5 is a fragmentary elevation upon a larger scale than in Fig. 1.
Fig. 6 is a section taken upon the lines 6—6 of Fig. 4.

Though the heel-jack support 8 is thus caused to move substantially in a horizontal plane, perpendicular to the axis of rotation of the cutter 12, there is one point in its movement where it is tilted slightly upward. The table 16 is provided with a vertically disposed slot 40 (shown in section in Figs. 2 and 4) rectangular in cross-section, in which is fixed a correspondingly shaped plate 42. The upper face of the table 16 is constituted of a plane metal plate 44, secured to the table 16, and a portion of which, in the neighborhood of the slot 40, is depressed, as shown more particularly at 46 in Figs. 2, 3 and 4. Where it not for the plate 42, the foot 34 of the heel-block support 15 would ride into this depression 46. This is prevented by the foot 34 riding on the upper edge of the plate 42. This upper edge of the plate 42 may be cam-shaped or plane, however, depending on circumstances, to constitute, with the foot 34, a third pair of cooperating guides. The upper edge of the plate 42 may be slightly raised above the bottom wall of the depression 46 or even above the plane of the plate 44, depending upon the shape that it is desired to form into the heel-attaching portion of the heel block. It is usually desired that the guiding portion of the upper edge of the plate 42 be slightly depressed or cam-shaped, as shown more particularly at 47 in Fig. 3. The third pair of cooperating guides, therefore, is, in this case, constituted of the guiding cam-shaped portion 47 of the plate 42 and the foot 34. Whereas the pair of guides 24, 28 and the pair of guides 30 and 32 guide the horizontal movement of the heel-block support 15, however, this third pair of guides 34, 42 causes the before-described slight rising of the support 15 out of the horizontal plane of normal movement of the support 15, and out of engagement with the table support 16, with corresponding tilting of the heel block. The result of this slight tilting movement will be understood from a comparison of Figs. 4 and 18. In Fig. 4, which represents the position of the heel block at a time when the foot 34 engages the plate 44 of the table 16, this heel block may be substantially horizontal. The points of the line 13 of the heel portion, or the points of the line 17 of the extreme shank portion, of the heel-attaching portion 3, 5, are then directly below corresponding points of the line 11 or the line 15, respectively. In Fig. 18, on the other hand, which represents the position of the heel block at a time when the foot 34 engages the plate 44, the heel-block support 15 is tilted downward slightly. This causes the upper portion of the arch of the heel, as viewed in Fig. 18, to engage a wider-diameter portion of the cutter 12 than the lower portion. More wood is, therefore, cut from the said upper portion of the heel than the lower portion. Points of the line 21 of the intermediate or arch portion 2 of the heel-attaching portion of the heel are thus caused to be formed more to the right of corresponding points of the line 19. The difference in vertical alinement is indicated in Fig. 18 by the dotted vertical lines 63 and 65. It is in this manner that the before-described difference in level of corresponding points of the lines 19 and 21 is produced, simultaneously with the forming operation of the heel-attaching portion of the heel block, yielding the before-described incline in the intermediate or arch portion 2 of the heel.

As before stated, corresponding points of the lines 11 and 13, as well as the lines 15 and 17, are not necessarily, however, strictly at the same level. In order to provide for different sizes and shapes of heels, it is necessary to adjust the position of the clamped heel block upon the support 15 with relation to the cutter 12 to produce different inclines in different parts of the heel block. One feature of adjustment is illustrated more particularly in Fig. 5, for adjusting the inclination of the heel block. The heel jack 8, with the jaws 4 and 6 carried thereby, are pivotally adjustable at 48 about an axis substantially perpendicular to the tread face 1 of the heel. The adjustment of the jack 8 about the pivot 48 may be effected by an arm 50 that is rigid with the jack 8, and the jack 8 may be fixed in pivotally adjusted position by means of a bolt 52 extending through an arcuate slot 54 in a bracket 56 that is carried by the support 15. The bolt 52 may be held in adjusted position in the opening 54 in any desired manner, as by means of a nut 57.

Figure 12:
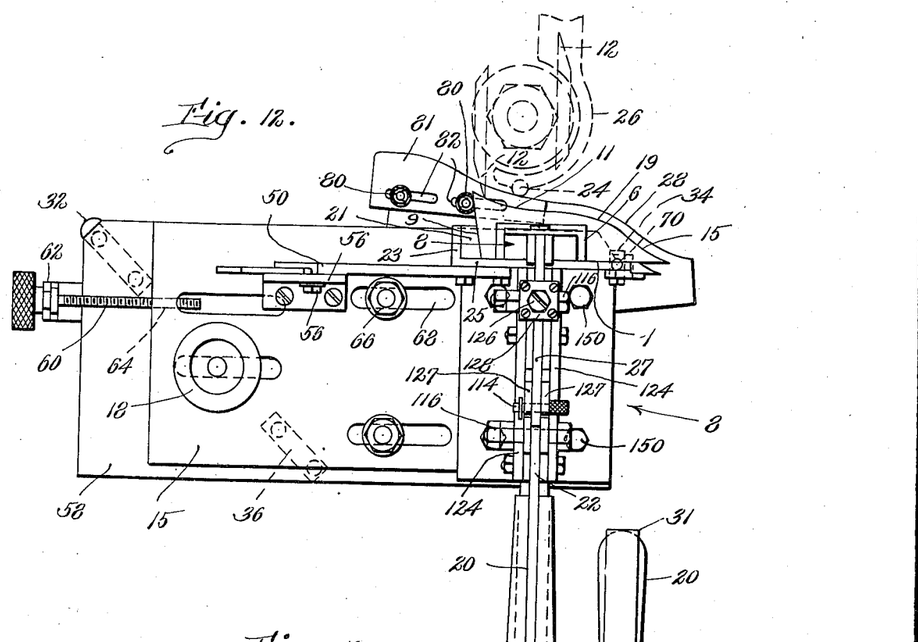
Figs. 12 and 13 are views corresponding to Figs. 10 and 11, respectively, of a modification.
Figure 13:
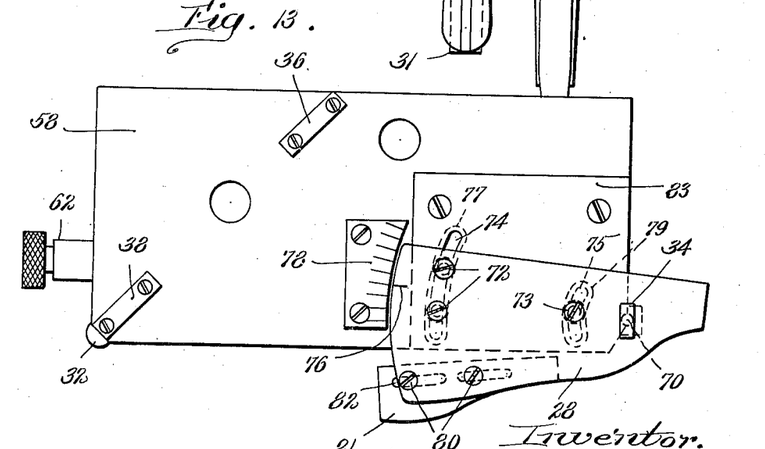

In Figs. 12 and 13, the heel jack 8 is shown disposed substantially at right angles to the direction of extension of the support 15. This position is suitable for the manufacture of a low-wedge heel, such as is illustrated in Fig. 9. To produce a high wedge heel, such as is illustrated in Fig. 8, it is desirable to adjust the angular position of the heel jack 8 upon the support 15. As illustrated more particularly in Figs. 1, 10 and 11 herein, this may be effected by positioning the jack 8 at the desired suitable incline, and fixing it in position by bolts.

It is desirable also to adjust the position of the jack 8 transversely of itself. To this end, the support 15, that carries the jack 8, is longitudinally adjustable on another support 58. This adjustment may be effected by means of a screw 60 turning loosely in a bracket 62 of the support 58 and threaded in a threaded opening 64 of the support 15. The support 15 may be fixed in adjusted position by means of bolts 66 extending through openings 68 in a manner similar to the operation described in connection with the bolt 52 and opening 54. The openings 68, however, are straight, instead of arcuate, extending in the direction of adjustment of the said support 15.

It is likewise desirable to adjust some or all of the guides. The guide 24 may be adjusted by adjusting the guard 26 upon which it is mounted by means of a screw 69, freely turnable in a bracket 71 in a stationary part of the machine and threaded in a slide 73 that carries the guard 26. A relocation of the parts may be effected by mounting the slide 73, not in the slideway 75, as illustrated in Fig. 1, but in a slideway 77, with corresponding relocation of the cutter 12. The slideways 73 and 75 and the cutter spindle 14 are mounted in a stationary part 79 of the machine.

The guide 30, if properly shaped, may be held fixed for a very large number of shapes and sizes of heels. It will not then be necessary or desired to provide for any adjustment of its cooperating guide 32, though the guide 30 may sometimes be replaced by another guide of somewhat different shape. The guiding projection 24 may also be fixed if the guide 28 is rendered suitably adjustable.

Figures 10, 11:
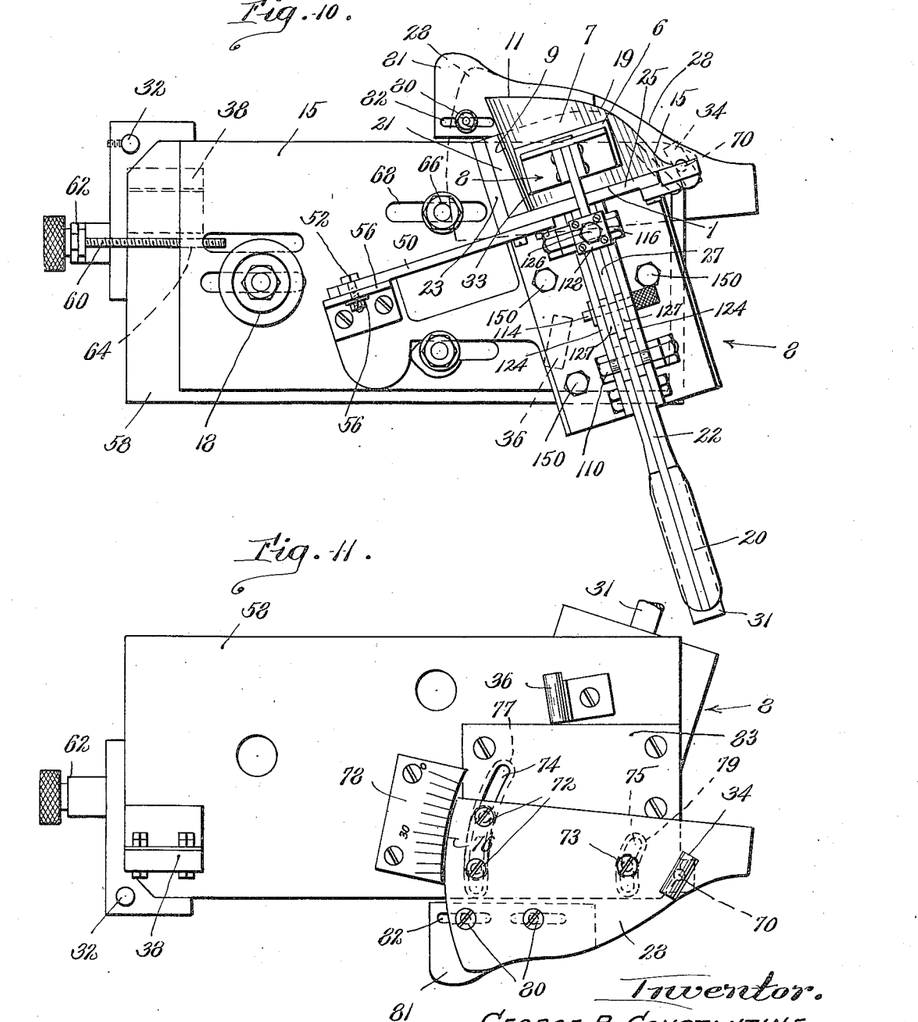
Fig. 10 is a plan of a portion of the mechanism shown in Fig. 1, but upon a larger scale.
Fig. 11 is a corresponding underside plan.

According to the specific embodiment of the invention that is illustrated more particularly in Figs. 11 and 13, the guide 28 comprises a guide plate that is pivotally mounted about an axis 70, and that is held in pivotally adjusted position by means of one or more bolts 72 and an arcuate slot 74 and a bolt 73 in an arcuate slot 75 of a nature similar to the bolt 52 and slot 54 described above in connection with Fig. 5. The bolts 72 and 73 may be inserted into plates or elongated washers 77 and 79 that are positioned in recesses in the upper surface of a plate 83, as illustrated more particularly in Fig. 4. The pivotal adjustment of the guide plate 28, once determined for a particular heel, may be restored, after adjustment for some other heel, by means of an index 76 on the plate 28 in cooperation with a scale 78. To increase the length of heel that may be manufactured with this single plate 28, a second guide plate 81 may be provided. The second guide plate 81 is shown adjustable on the guide plate 28 by means of bolts 80 and a groove 82 of the nature before described, but that is only a detail, the important fact being that the guide plate 81 be adjustable and extensible with respect to the jack 8. The guide plates 28 and 81 constitute, in effect, a single cam for treating many different-length heels. If the guide plate 81 were mounted on the support 15, for example, instead of on the guide plate 28, it would be rendered pivotally adjustable independently of the pivotal adjustment of the guide plate 28 about the pivot 70.

To adjust the plate guide 42, vertically, in a direction perpendicular to the plane of the table 16, it may be pushed upward by a screw 84, as shown in Fig. 2. The screw 84 may be carried by a bracket 86. Once the level of the guide plate 42 has been adjusted, it may be clamped in adjusted position in any convenient way. According to the specific construction illustrated in Fig. 2, this is effected by means of a bolt 88 mounted on brackets 90 and 92; the guide plate 42 is held between the bracket 92 and a clamping plate 94, and the bolt 88 holds the parts tightly clamped together by nuts 96 and 98.

Figure 7:
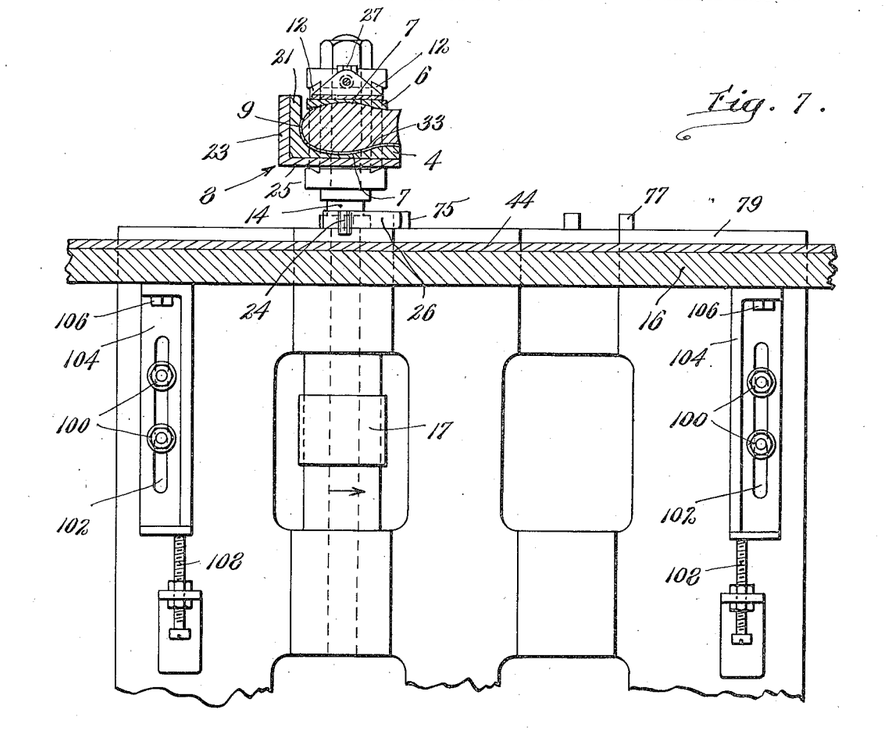
Fig. 7 is a section taken upon the lines 7—7 of Fig. 1 or Fig. 4.

The table 16 is rendered vertically adjustable by means of bolts 100 in slots 102 of brackets 104, illustrated in Fig. 7. The table 16 is secured to the brackets 104 by bolts 106. Fine adjustment of the table 16 may be effected by screws 108.

Further modifications will occur to persons skilled in the art, and all such are considered to fall within the spirit and scope of the invention, as defined in the appended claims.

What is claimed is:

1. A method of making a wedge heel from a heel block the back and the sides of which have previously been formed that comprises forming the attaching portion of the heel block to substantially the shape of the heel-attaching arch and shank portions of a shoe to which the heel is to be attached, with the shank portion extending to the tread face of the heel block.

2. A method of making a wedge heel from a heel block the back and the sides of which have previously been formed that comprises forming the attaching portion of the heel block to substantially the shape of the heel-attaching arch and shank portions of a shoe to which the heel is to be attached, with the shank portion extending to the tread face of the heel block, and transversely inclining the arch during the said forming of the said attaching portion of the heel block.

3. A machine for making wedge heels having, in combination, a heel-block support, means for clamping to the support a wedge-heel block with the attaching portion thereof exposed, a cutter, the support and the cutter being relatively movable along a path corresponding to the shape of the heel-attaching, arch and shank portions of a shoe to which the heel is to be attached, with the shank portion extending to the tread face of the heel block, to cause the exposed attaching portion of the heel block to be cut by the cutter along the said path during such relative movement, and means for guiding the relative movement of the support and the cutter along the said path to cause the cutter, during such relative movement, to form the attaching portion of the heel block substantially to the said shape.

4. A machine for making wedge heels having, in combination, a heel-block support, means for clamping to the support a wedge-heel block with the attaching portion thereof exposed, a cutter, the support and the cutter being relatively movable along a path corresponding to the shape of the heel-attaching, arch and shank portions of a shoe to which the heel is to be attached, with the shank portion extending to the tread face of the heel block, to cause the exposed attaching portion of the heel block to be cut by the cutter along the said path during such relative movement, means for guiding the relative movement of the support and the cutter along the said path to cause the cutter, during such relative movement, to form the attaching portion of the heel block substantially to the said shape, and means for transversely inclining the arch during the forming.

5. A machine for making wedge heels having, in combination, a heel-block support, means for clamping to the support a wedge-heel block with the attaching portion thereof exposed, a cutter, the heel-block support being movable in substantially a plane along a path corresponding to the shape of the heel-attaching, arch and shank portions of a shoe to which the heel is to be attached, with the shank portion extending to the tread face of the heel block, to cause the attaching portion of the heel block to be cut by the cutter along the said path, and means for guiding the heel-block support during its movement in substantially the said plane along the said path to cause the cutter, during the movement of the heel-block support, to form the attaching portion of the heel block substantially to the said shape.

6. A machine for making wedge heels having, in combination, a heel-block support, means for clamping to the support a wedge-heel block with the attaching portion thereof exposed, a cutter, a support over which the heel-block support is movable along a path corresponding to the shape of the heel-attaching, arch and shank portions of a shoe to which the heel is to be attached, with the shank portion extending to the tread face of the heel block, to cause the exposed attaching portion of the heel block to be cut by the cutter along the said path, and means for guiding the movement of the heel-block support over the second-named support along the said path to cause the cutter, during the movement of the heel-block support, to form the attaching portion of the heel block substantially to the said shape.

7. A machine for making wedge heels having, in combination, a heel-block support, means for clamping to the support a wedge-heel block with the attaching portion thereof exposed, a cutter, a support over which the heel-block support is movable along a path corresponding to the shape of the heel-attaching, arch and shank portions of a shoe to which the heel is to be attached, with the shank portion extending to the tread face of the heel block, to cause the exposed attaching portion of the heel block to be cut by the cutter along the said path, and means for guiding the movement of the heel-block support over the second-named support along the said path to cause the cutter, during the movement of the heel-block support, to form the attaching portion of the heel block substantially to the said shape, and means for tilting the heel-block support during such movement.

8. A machine for making wedge heels having, in combination, a heel-block support, means for clamping to the support a wedge-heel block with the attaching portion thereof exposed, a cutter, a support over which the heel-block support is movable to cause the exposed attaching portion of the heel block to be engaged by the cutter, and means for guiding the movement of the heel-block support over the second-named support and out of engagement with the second-named support to cause the cutter, during the movement of the heel-block support, to form the attaching portion of the heel block substantially to the shape of the heel-and-shank portion of a shoe to which the heel is to be attached.

9. A machine for making wedge heels having, in combination, a heel-block support, means for clamping to the support a wedge-heel block with the attaching portion thereof exposed, a cutter, the support and the cutter being relatively movable to cause the exposed attaching portion of the heel block to be engaged by the cutter during such relative movement, and a plurality of guides, the support having cooperating guides for slidably engaging the first-named guides simultaneously during the relative movement of the support and the cutter, and the guides being shaped to cooperate to cause the cutter, during the said relative movement of the support and the cutter, to form the attaching portion of the heel block substantially to the shape of the heel-and-shank portion of a shoe to which the heel is to be attached.

10. A machine for making wedge heels having, in combination, a plurality of guides, a movable heel-block support having cooperating guides for slidably engaging the first-named guides simultaneously during the movement of the support, means for clamping to the support a wedge-heel block with the attaching portion thereof exposed, and a cutter for engaging the exposed attaching portion of the heel block during the movement of the support with the cooperating guides in slidable engagement with the first-named guides, the guides being shaped to cooperate to cause the cutter, during the said movement of the support, to form the attaching portion of the heel block substantially to the shape of the heel-and-shank portion of a shoe to which the heel is to be attached.

11. A machine for making wedge heels having, in combination, a plurality of guides, a heel-block support movable in substantially a plane and having cooperating guides for slidably engaging the first-named guides simultaneously during the movement of the support, means for clamping to the support a wedge-heel block with the attaching portion thereof exposed, and a cutter rotatable about an axis approximately perpendicular to the plane of movement of the support for engaging the exposed attaching portion of the heel block during the movement of the support with the cooperating guides in slidable engagement with the first-named guides, the guides being shaped to cooperate to cause the cutter, during the said movement of the support, to form the attaching portion of the heel block substantially to the shape of the heel-and-shank portion of a shoe to which the heel is to be attached.

12. A machine for making wedge heels having, in combination, a plurality of guides, a movable heel-block support having cooperating guides for slidably engaging the first-named guides simultaneously during the movement of the support, means for clamping to the support a wedge-heel block with the attaching portion thereof exposed, means for adjusting the position of the clamped heel upon the support, and a cutter for engaging the exposed attaching portion of the heel block during the movement of the support with the cooperating guides in slidable engagement with the first-named guides, the guides being shaped to cooperate to cause the cutter, during the said movement of the support, to form the attaching portion of the heel block substantially to the shape of the heel-and-shank portion of a shoe to which the heel is to be attached.

13. A machine for making wedge heels having, in combination, a plurality of guides, a movable heel-block support having cooperating guides for slidably engaging the first-named guides simultaneously during the movement of the support, means for clamping to the support a wedge-heel block with the attaching portion thereof exposed, means for adjusting the inclination of the clamped heel upon the support, and a cutter for engaging the exposed attaching portion of the heel block during the movement of the support with the cooperating guides in slidable engagement with the first-named guides, the guides being shaped to cooperate to cause the cutter, during the said movement of the support, to form the attaching portion of the heel block substantially to the shape of the heel-and-shank portion of a shoe to which the heel is to be attached.

14. A machine for making wedge heels having, in combination, a plurality of guides, a movable heel-block support having cooperating guides for slidably engaging the first-named guides simultaneously during the movement of the support, means for clamping to the support a wedge-heel block with the attaching portion thereof exposed, and a cutter for engaging the exposed attaching portion of the heel block during the movement of the support with the cooperating guides in slidable engagement with the first-named guides, one of the first-named guides being disposed adjacent to the cutter, another of the first-named guides being disposed remote from the cutter, and the guides being shaped to cooperate to cause the cutter, during the said movement of the support, to form the attaching portion of the heel block substantially to the shape of the heel-and-shank portion of a shoe to which the heel is to be attached.

15. A machine for making wedge heels having, in combination, a plurality of guides, a movable heel-block support having cooperating guides for slidably engaging the first-named guides simultaneously during the movement of the support, means for clamping to the support a wedge-heel block with the attaching portion thereof exposed, and a cutter for engaging the exposed attaching portion of the heel block during the movement of the support with the cooperating guides in slidable engagement with the first-named guides, the guides being shaped to cooperate to cause the cutter, during the said movement of the support, to form the attaching portion of the heel block substantially to the shape of the heel-and-shank portion of a shoe to which the heel is to be attached, one of the guides being adjustable.

16. A machine for making wedge heels having, in combination, two guides, a movable heel-block support having two cooperating guides for slidably engaging the respective first-named guides simultaneously during the movement of the support, means for clamping to the support a wedge-heel block with the attaching portion thereof exposed; and a cutter for engaging the exposed attaching portion of the heel block during the movement of the support with the cooperating guides in slidable engagement with the respective first-named guides, the guides being shaped to cooperate to cause the cutter, during the said movement of the support, to form the attaching portion of the heel block substantially to the shape of the heel-and-shank portion of a shoe to which the heel is to be attached.

17. A machine for making wedge heels having, in combination, a heel-block support, means for clamping to the support a wedge-heel block with the attaching portion thereof exposed, a cutter, the support and the cutter being relatively movable to cause the exposed attaching portion of the heel block to be engaged by the cutter during such relative movement, a guide disposed adjacent to the cutter, a guide surface disposed remote from the cutter, the support having a cooperating guiding surface for slidably engaging the guide and a cooperating guide for slidably engaging the first-named guiding surface during the relative movement of the support and the cutter, and the guides being shaped to cause the cutter, during the said relative movement of the support and the cutter, to form the attaching portion of the heel blank substantially to the shape of the heel-and-shank portion of a shoe to which the heel is to be attached.

18. A machine for making wedge heels having, in combination, a heel-block support, means for clamping to the support a wedge-heel block with the attaching portion thereof exposed, a cutter, the support and the cutter being relatively movable to cause the exposed attaching portion of the heel block to be engaged by the cutter during such relative movement, a guide disposed adjacent to the cutter, a guide surface disposed remote from the cutter, the support having a cooperating guiding surface for slidably engaging the guide and a cooperating guide for slidably engaging the first-named guiding surface during the relative movement of the support and the cutter, the guides being shaped to cause the cutter, during the said relative movement of the support and the cutter, to form the attaching portion of the heel blank substantially to the shape of the heel-and-shank portion of a shoe to which the heel is to be attached, and the cooperating guiding surface being adjustable.

19. A machine for making wedge heels having, in combination, a heel-block support, means for clamping to the support a wedge-heel block with the attaching portion thereof exposed, a cutter, the support and the cutter being relatively movable to cause the exposed attaching portion of the heel block to be engaged by the cutter during such relative movement, a guide disposed adjacent to the cutter, a guide surface disposed remote from the cutter, the support having a cooperating guiding surface for slidably engaging the guide and a cooperating guide for slidably engaging the first-named guiding surface during the relative movement of the support and the cutter, the guides being shaped to cause the cutter, during the said relative movement of the support and the cutter, to form the attaching portion of the heel blank substantially to the shape of the heel-and-shank portion of a shoe to which the heel is to be attached, and the cooperating guiding surface being extensible.

20. A machine for making wedge heels having, in combination, a heel-block support, means for clamping to the support a wedge-heel block with the attaching portion thereof exposed, a cutter, the support and the cutter being relatively movable to cause the exposed attaching portion of the heel block to be engaged by the cutter during such relative movement, a guide disposed adjacent to the cutter, a guide surface disposed remote from the cutter, the support having a cooperating guiding surface for slidably engaging the guide and a cooperating guide for slidably engaging the first-named guiding surface during the relative movement of the support and the cutter, the guides being shaped to cause the cutter, during the said relative movement of the support and the cutter, to form the attaching portion of the heel blank substantially to the shape of the heel-and-shank portion of a shoe to which the heel is to be attached, and the cooperating guiding surface being pivotally adjustable and extensible.

21. A machine for making wedge heels having, in combination, two guides, a heel-block support movable in substantially a plane and having two cooperating guides for slidably engaging the respective first-named guides simultaneously during the movement of the support, a third guide, the support having a third cooperating guide for slidably engaging the first-named third guide to move the support out of the plane during a portion of the movement of the support, means for clamping to the support a wedge-heel block with the attaching portion thereof exposed, and a cutter for engaging the exposed attaching portion of the heel block during the movement of the support with the three cooperating guides in slidable engagement with the three guides with which they respectively cooperate, the guides being shaped to cause the cutter, during the said movement of the support, to form the attaching portion of the heel block substantially to the shape of the heel-and-shank portion of a shoe to which the heel is to be attached.

22. A machine for making wedge heels having, in combination, a heel-block support, means for clamping to the support a wedge-heel block with the attaching portion thereof exposed, a cutter, a support over which the heel-block support is movable to cause the exposed attaching portion of the heel block to be engaged by the cutter, two guides, the support having two cooperating guides for slidably engaging the respective first-named guides simultaneously during the movement of the heel-block support over the second-named support, and a third guide raised above the second-named support, the heel-block support having a third cooperating guide for slidably engaging the first-named third guide to cause the heel-block support to rise above the second-named support during the movement of the heel-block support over the second-named support, and the guides being shaped to cause the cutter, during the said movement of the heel-block support, to form the attaching portion of the heel-block substantially to the shape of the heel-and-shank portion of a shoe to which the heel is to be attached.

23. A machine for making wedge heels having, in combination, a heel-block support, means for clamping to the support a wedge-heel block with the attaching portion thereof exposed, a cutter, the support and the cutter being relatively movable along a path corresponding to the shape of the heel-attaching, arch and shank portions of a shoe to which the heel is to be attached, with the shank portion extending to the tread face of the heel block, to cause the exposed attaching portion of the heel-block to be cut by the cutter along the said path during such relative movement, means for guiding the relative movement of the support and the cutter along the said path to cause the cutter, during such relative movement, to form the attaching portion of the heel block substantially to the said shape, and means for adjusting the clamping means on the heel-block support.

24. A machine for making wedge heels having, in combination, two guides, a heel-block support movable in substantially a plane and having two cooperating guides for slidably engaging the respective first-named guides simultaneously during the movement of the support, a third guide, the support having a third cooperating guide for slidably engaging the first-named third guide to move the support out of the plane during a portion of the movement of the support, means for clamping to the support a wedge-heel block with the attaching portion thereof exposed, a cutter for engaging the exposed attaching portion of the heel block during the movement of the support with the three cooperating guides in slidable engagement with the three guides with which they respectively cooperate, the guides being shape to cause the cutter, during the said movement of the support, to form the attaching portion of the heel block substantially to the shape of the heel-and-shank portion of a shoe to which the heel is to be attached, and means for adjusting the third guide in a direction substantially perpendicular to the said plane.

GEORGE ROLAND CONSTANTINE.